Dec. 20, 1927.

W. S. POE

TRAP

Filed Jan. 10, 1927

1,653,411

Inventor

W.S. Poe

By Lacey & Lacey, Attorneys

Patented Dec. 20, 1927.

1,653,411

UNITED STATES PATENT OFFICE.

WILLIAM S. POE, OF HAY, WASHINGTON.

TRAP.

Application filed January 10, 1927. Serial No. 160,277.

This invention relates to fishing and trapping and more particularly to a self-setting trap adapted to catch rats and other animals. Still more specifically the invention relates to a self-setting trap of the type in which the animal to be caught steps upon a platform in order to reach the bait and the weight of the animal causes the platform to move downwardly and allows the animal to drop into a housing carrying the platform.

At the present time traps of this general type are in use but it has been found that they are not satisfactory as the platform is not properly supported and is liable to be moved when the animal first steps upon it and cause the animal to be frightened and leave the trap without being caught. Therefore, one object of the invention is to very firmly support the platform and prevent it from having movement until the animal has completely moved onto the platform and attempted to eat or remove bait from a bait holder operatively connected with a latch which supports the platform in a horizontal position.

It has also been found that, when a tilting platform moves downwardly, an animal standing upon it will often succeed in springing off the platform instead of dropping into the receptacle. It is, therefore, another object of the invention to provide the trap with an entrapping wheel, the blades of which successively move into a platform forming position so that, when a blade upon which an animal is standing is released, the following blade will serve to prevent the animal from successfully leaping to a place of safety.

Another object of the invention is to partially enclose the portion of the trap wheel which extends above the top of the housing so that two animals may not step upon oppositely extending horizontal blades of the wheel and one animal permitted to eat or remove the bait without the wheel being turned.

Another object of the invention is to provide the trap with an improved combination latch and bait holder and to so mount the latch and bait holder that the latch will be normally held in operative engagement with a platform forming blade of the trap wheel but permitted to be very easily moved out of operative engagement therewith when pressure is applied to the bait holder.

Another object of the invention is to mount the housing or receptacle of the trap in a frame which will to a great extent conceal the housing and allow the animal to easily approach the platform.

The invention is illustrated in the accompanying drawing, wherein

Figure 1:
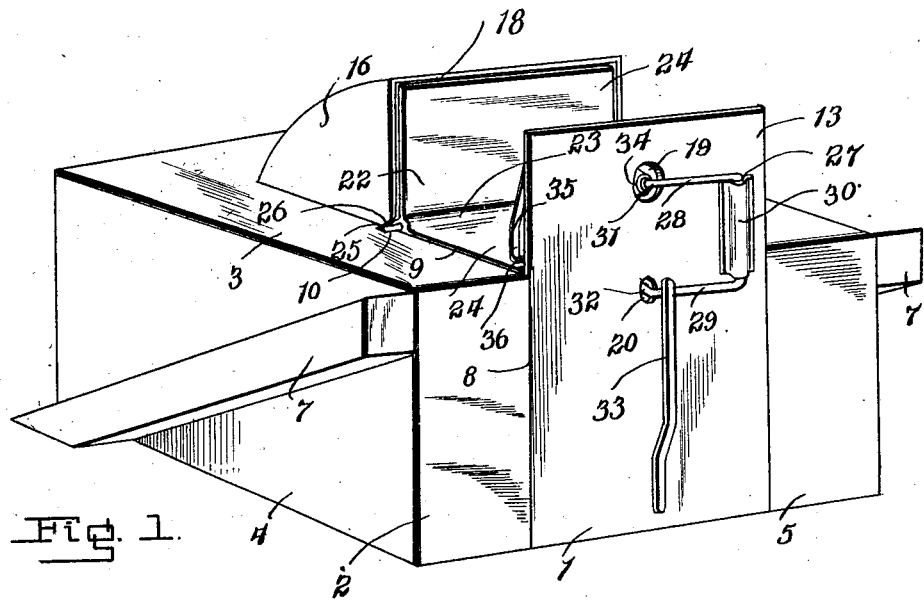
Figure 1 is a perspective view of the improved trap.

The improved trap includes a housing, indicated in general by the numeral 1, and a frame 2 in which the housing is fitted. The frame is preferably formed of wood, although other materials may be employed if so desired and consists of a top 3, side walls 4 and front and rear walls 5 and 6. Runways 7 are secured against the side walls 4 and are disposed at an incline, as shown in Fig. 1, so that an animal to be caught may readily move upwardly upon the runways and onto the top 3 of the frame. An opening 8 is formed in the front wall 5 intermediate its width and communicates with an opening 9 formed in the top 3. The opening 9 extends longitudinally of the top intermediate its sides and at opposite sides of the opening there have been provided recesses 10, the purpose of which will be hereinafter set forth.

The housing 1 is formed of metal so that animals may not gnaw holes in order to escape after dropping into the housing and includes a bottom 11, side walls 12 and front and rear walls 13 and 14. The rear wall and rear portions of the side walls are extended upwardly to form a hood 15 having end walls 16 and a transversely curved top 17, the forward edge portion of which is bent downwardly to provide a depending lip 18 which extends across the top of the open front of the hood. The front wall 13 of the housing is also extended upwardly and is provided with upper and lower openings 19 and 20 disposed intermediate its width and one above the other. Openings 21 may be formed in the side walls of the housing so that animals entrapped therein may be supplied with air or the openings may be omitted so that the housing may be partially filled with water in order to drown the animals.

The trap wheel, which is indicated in general by the numeral 22, is also formed of metal and includes a hub 23 from which extend radiating blades 24 of such length that they may move freely through the hood and successively extend across the open top of the housing between the hood and front wall 13. An axle extends through the hub 23 with its end portions projecting to provide pintles 25 which fit into recesses 26 formed in the side walls of the housing and project into the recesses formed in the upper wall 3 of the frame at opposite sides of the opening 9. If desired, the pintles may be formed separate from each other and suitably secured in the end portions of the hub instead of consisting of a single rod extending through the hub with its end portions projecting therefrom. It will, therefore, be seen that the trap wheel will be rotatably mounted in the housing but may be lifted out of the housing when necessary.

Figure 2:
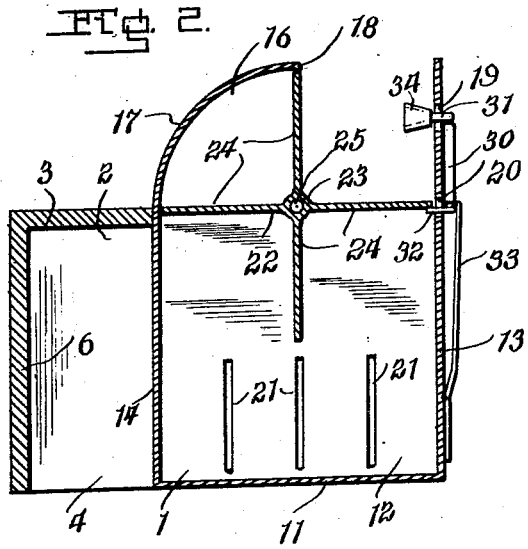
Fig. 2 is a vertical longitudinal sectional view through the trap.
Figure 3:
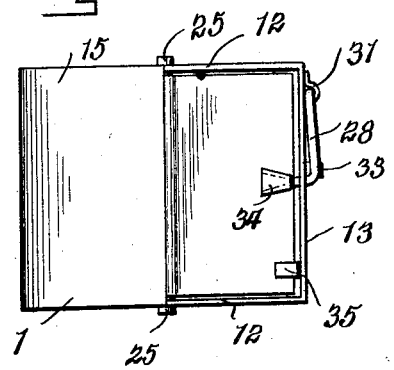
Fig. 3 is a top plan view of the housing removed from the frame.

In order to releasably support the platform forming blade of the trap wheel, there has been provided a combined latch and bait holder. This latch and bait holder is formed of wire bent to assume a U shape and provide a rocker shaft 27 from which extend arms 28 and 29. The rocker shaft is rotatably mounted in a bearing 30 secured vertically upon the upwardly projected end portion of the front wall 13 and the free end portions of the arms 28 and 29 are bent to provide bills 31 and 32 which project through the openings 19 and 20. The arm 29 is engaged by a spring strip 33 which yieldably retains the latch in an operative position with the bill 32 extending beneath the platform forming blade of the trap wheel, as shown in Fig. 2, and very effectively prevents the blade from moving downwardly until the latch is swung to an inoperative position. A bait holder, such as a cup 34, is carried by the bill 31 of the upper arm, and it will be readily understood that, when an animal is standing upon the platform and attempts to eat bait held by the cup 34, pressure will be exerted which will cause the arm 28 and arm 29 to be swung away from the front wall against the action of the spring strip 33 and the bill 32 moved from beneath the platform. The weight of the animal will then cause the platform to be swung downwardly and the paddle previously disposed at the front of the hood moved into a platform forming position where it will be supported upon the bill 32. The trap wheel must be preventd from having retrograde rotation, and in order to do so there has been provided a spring strip 35 which is secured against the inner face of the wall 13 adjacent the upper end thereof and is disposed vertically with its lower end bent to form a foot 36 for engaging the upper face of the platform forming blade. By this arrangement the platform will be securely held against either upward or downward movement when resting upon the bill 32 and the animal will not be frightened away by movement of the platform when it first steps upon it. It should also be noted that, when the platform is released and moved downwardly, the following blade will quickly move into place and will very effectively prevent an animal from successfully leaping upwardly off the descending blade and onto the top of the frame. Since the hood covers the rear portion of the trap wheel, one animal may not walk upon the platform and consume the bait while another is standing upon the rearwardly extending blade of the wheel. Therefore, the animal is sure to be caught and will be confined in the housing until removed by the person to set the trap. This can be accomplished by removing the trap wheel and then extracting the animal through the open top of the housing or if so desired a door may be provided in one wall of the housing and secured shut in any desired manner.

Having thus described the invention, I claim:

1. A trap comprising a housing open at its top and provided with an upwardly extending front wall, a trap wheel rotatably carried by said housing and having radiating blades adapted to successively move across the open top of the housing to provide a platform as the wheel rotates, a U-shaped latch and bait holder having its bridge portion vertically disposed and rotatably connected with the front wall of said housing and its arms extending horizontally, one arm having an end portion extending below the platform forming blade and the other carrying a bait holder disposed above the said blade, a spring yieldably retaining the latch in a normal position to prevent rotation of the trap wheel in one direction, and means to prevent retrograde rotation of the trap wheel.

2. A trap comprising a housing open at its top and having its front wall projected upwardly, a trap wheel rotatably mounted in said housing and having radiating blades adapted to successively extend towards the front wall and provide a platform, the front wall being formed with openings disposed one above and the other below the platform, a combined latch and bait holder having a rocker shaft vertically disposed and rotatably connected with the outer face of the front wall of said housing and upper and lower arms extending from the shaft transversely across the wall and having finger portions projected through the openings in the wall, the finger of the lower arm projecting beneath the platform forming blade to prevent rotation of the wheel in one direction and the finger of the upper arm extending above the said blade and provided with bait holding means, a spring strip carried by the front wall and extending transversely across one arm to yieldably retain the latch in an operative position, and a spring strip carried by the inner face of the front wall and disposed above the platform forming blade to prevent retrograde rotation of the wheel.

3. A trap comprising a frame having a top formed with an opening and a front wall formed with an opening communicating with the opening in its top, a housing fitted into said frame with its front wall closing the opening in the front wall of the frame, said housing being open at its top and having its side walls formed with opposed recesses registering with recesses in the top of the frame at opposite sides of the opening therein, a trap wheel having an axle seated in the recesses of said housing and projecting into the recesses of said frame and blades radiating from the axle and adapted to close the open top of the housing and form a platform, a latch to releasably hold the trap wheel against rotation in one direction, a bait holder extending above the platform forming blade and adapted to move the latch out of an operative position, and means to prevent retrograde rotation of the trap wheel.

In testimony whereof I affix my signature.

WILLIAM S. POE. [L. S.]